US012630253B2

(12) United States Patent　　(10) Patent No.:　US 12,630,253 B2
Schultz et al.　　　　　　　　(45) **Date of Patent:　*May 19, 2026**

(54) NARROW THREE WHEELED VEHICLE WITH STABILIZING AND MODULAR MECHANISMS

(71) Applicant: TUGA-GLOBAL, INC., Grand Haven, MI (US)

(72) Inventors: Kraig Schultz, Grand Haven, MI (US); Cesar Manuel de Castro Guimarães Lopes Barbosa, Sintra (PT)

(73) Assignee: TUGA-GLOBAL, INC., Grand Haven, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,415

(22) Filed: May 12, 2023

(65) Prior Publication Data

US 2023/0278656 A1　　Sep. 7, 2023

Related U.S. Application Data

(63) Continuation of application No. 17/159,507, filed on Jan. 27, 2021, now Pat. No. 11,745,819.

(Continued)

(51) Int. Cl.
*B62K 5/06*　　　　(2006.01)
*B60L 15/20*　　　(2006.01)
(Continued)

(52) U.S. Cl.
CPC ............... *B62K 5/06* (2013.01); *B60L 15/20* (2013.01); *B62J 1/00* (2013.01); *B62J 1/14* (2013.01);
(Continued)

(58) Field of Classification Search
CPC . B62K 5/06; B62K 5/027; B62K 25/00; B62J 1/00; B62J 23/00; B62J 43/16; B62M 7/00
See application file for complete search history.

(56) References Cited

U.S. PATENT DOCUMENTS 3,845,847 A * 11/1974 Camp .................. B60W 10/18
　　　　　　　　　　　　　　　　　　　74/489
3,873,127 A　　3/1975 Mcnichol, Jr. et al.
(Continued)

FOREIGN PATENT DOCUMENTS

FR　　　　2265600 A1　　1/1977
WO　　　8903336 A1　　4/1989
WO　　2012092182 A1　　7/2012

OTHER PUBLICATIONS

Brundeli 654L Leanster, http://www.disenoart.com/encyclopedia/vehicles/road/bikes/Brundeli_654L_Leanster.html.
(Continued)

*Primary Examiner* — Paul N Dickson
(74) *Attorney, Agent, or Firm* — Jacob M. Ward; Ward Law Office LLC

(57)　　　　ABSTRACT

A three-wheeled vehicle includes a vehicle frame supported by a single wheel engaging the ground in the front and two wheels engaging the ground in the rear. The operator area of the vehicle may include seating for a driver and a passenger, one in front of the other. The three-wheeled vehicle is uniquely designed so that it can be easily modified by addition or removal of additional structures after it is purchased. The vehicle is ultra-narrow but achieves stability by unique mechanisms.

14 Claims, 12 Drawing Sheets

Related U.S. Application Data

(60) Provisional application No. 62/966,186, filed on Jan. 27, 2020.

(51) Int. Cl.

| | |
|---|---|
| *B62J 1/00* | (2006.01) |
| *B62J 1/14* | (2006.01) |
| *B62J 23/00* | (2006.01) |
| *B62J 43/16* | (2020.01) |
| *B62K 5/027* | (2013.01) |
| *B62K 25/00* | (2006.01) |
| *B62M 7/00* | (2010.01) |

(52) U.S. Cl.
CPC .............. *B62J 23/00* (2013.01); *B62J 43/16* (2020.02); *B62K 5/027* (2013.01); *B62K 25/00* (2013.01); *B62M 7/00* (2013.01)

(56) References Cited

U.S. PATENT DOCUMENTS

| | | | |
|---|---|---|---|
| 4,109,747 A | | 8/1978 | Hornagold et al. |
| 4,191,065 A | * | 3/1980 | Golobay .................. G05G 5/18 |
| | | | 74/489 |
| 4,336,964 A | | 6/1982 | Pivar |
| 4,437,535 A | | 3/1984 | Winchell et al. |
| 4,574,902 A | | 3/1986 | Irimajiri |
| 4,625,825 A | | 12/1986 | Ethier |
| 4,632,448 A | | 12/1986 | Yagasaki et al. |
| 5,518,081 A | | 5/1996 | Thibodeau |
| 6,328,121 B1 | | 12/2001 | Woodbury et al. |
| 6,497,548 B1 | * | 12/2002 | Roy ..................... B23Q 1/5462 |
| | | | 901/29 |
| 7,343,997 B1 | | 3/2008 | Matthies |
| 7,568,541 B2 | | 8/2009 | Pfeil et al. |
| 8,104,987 B2 | * | 1/2012 | Johnson ............. A63B 22/0605 |
| | | | 403/104 |
| 8,776,932 B1 | | 7/2014 | Bussinger et al. |
| 10,300,971 B2 | | 5/2019 | Holroyd et al. |
| 10,513,303 B2 | | 12/2019 | Frohnmayer |
| 10,518,600 B2 | | 12/2019 | Reybrouck et al. |
| 2002/0027030 A1 | | 3/2002 | Tagami et al. |
| 2006/0243247 A1 | * | 11/2006 | Yokoi ................... F02D 11/107 |
| | | | 123/399 |
| 2009/0321169 A1 | | 12/2009 | Bedard et al. |
| 2012/0037441 A1 | | 2/2012 | Frohnmayer et al. |
| 2012/0181765 A1 | | 7/2012 | Hill et al. |
| 2016/0009135 A1 | | 1/2016 | Jong |
| 2016/0234992 A1 | | 8/2016 | Clifford et al. |
| 2017/0000047 A1 | * | 1/2017 | Binder ................. A01G 25/092 |
| 2017/0158277 A1 | | 6/2017 | Hsu et al. |
| 2018/0057097 A1 | | 3/2018 | Frohnmayer |
| 2018/0281886 A1 | | 10/2018 | Mizuno et al. |
| 2019/0023347 A1 | | 1/2019 | Block et al. |
| 2019/0275834 A1 | | 9/2019 | Budweil |
| 2020/0148297 A1 | * | 5/2020 | Kosco .................. B62K 15/008 |
| 2020/0156733 A1 | * | 5/2020 | Spector .................. B60L 50/20 |

OTHER PUBLICATIONS

Written Opinion of the International Searching Authority dated Apr. 12, 2021.

\* cited by examiner

100

110                                    170

170                                    100

100

170

NARROW THREE WHEELED VEHICLE WITH STABILIZING AND MODULAR MECHANISMS

CROSS-REFERENCE TO RELATED APPLICATIONS

This application is a continuation of U.S. patent application Ser. No. 17/159,507, filed on Jan. 27, 2021, which claims the benefit of U.S. Provisional Application No. 62/966,186, filed on Jan. 27, 2020. The entire disclosures of the above applications are incorporated herein by reference.

FIELD

The disclosure relates generally to a motorized vehicle and, more specifically, a three wheeled motorized vehicle.

BACKGROUND

Due to the growing human population and use of fossil fuels the ecosystem of the planet is being damaged. This damage may be mitigated by reducing energy use.

The majority of automobiles on the road can carry one (1) passenger. However, most automobiles are designed to carry many more. This results in more energy being used than is required for transport of passengers. In addition, because most automobiles must carry multiple passengers, the automobiles must be larger and more expensive to produce. Also, larger automobiles are more prone to becoming stuck in traffic jams because of their size. Furthermore, larger automobiles are more difficult to park.

To help solve these problems, many have tried to combine the practical attributes of a car and a motorcycle. An automobile designed to carry one to two passengers and cargo, with an electric drive and an aerodynamic body, can be more efficient and pollute less than a traditional automobile.

Prior attempts by others have failed to find the correct combination of vehicle and business components required to create a new market segment between the motorcycle and the automobile. No one has succeeded to date in bringing a fully enclosed, narrow vehicle to high volume production.

All these known vehicles further suffer from excessive price, excessive width, improper styling, or a lack of safety and comfort. In addition, they generally lack a strong value proposition, so their proponents have been unable to create a new, commercially viable category of vehicle. It is clearly difficult to provide a commercially viable vehicle with these combinations of features.

There is a continuing need for a three wheeled motorized vehicle or "trike" that is inexpensive and more efficient than traditional automobiles. Desirably, the motorized vehicle is modular and customizable.

SUMMARY

In concordance with the instant disclosure, a three wheeled motorized vehicle or "trike" that is inexpensive and more efficient than traditional automobiles, while being modular and customizable, has been surprisingly discovered.

In one embodiment, a motorized vehicle includes a chassis having a front portion and a rear portion. The front portion has a front wheel and a driver seat. The rear portion has a first rear wheel, a second rear wheel, and a rear axle assembly. The rear axle assembly is configured to be selectively moved between a retracted position and an extended position to maintain stability of the motorized vehicle at various speeds.

In another embodiment, the motorized vehicle further includes at least one battery module, a first rear electric drive motor, a second rear electric drive motor, an electric drive motor controller, a prime mover, and a rear axle assembly controller. The at least one battery module is configured to power a movement of at least one of the front wheel, the first rear wheel, and the second rear wheel, in operation. The first rear electric drive motor is connected to the first rear wheel. The second rear electric drive motor is connected to the second rear wheel. The electric drive motor controller is disposed on the front portion of the chassis. The electric drive motor controller is in electrical communication with the first rear electric drive motor and the second rear electric drive motor. The electric drive motor controller is configured to permit a driver to control the movement the first rear wheel and the second rear wheel. The prime mover is disposed in the rear portion of the chassis and is configured to selectively move the rear axle assembly between the retracted position and the extended position. The prime mover is one of an electric drive motor, an air cylinder, and a hydraulic cylinder. The rear axle assembly controller is in communication with the rear axle assembly, and the rear axle assembly controller is configured to one of manually and automatically move the rear axle assembly between the retracted position and the extended position. The rear axle assembly includes a linear actuator in communication with a first rear wheel axle and a second rear wheel axle. Each of the first rear wheel axle and the second rear wheel axle has a gear rack. The linear actuator also includes a pinion in communication with prime mover and the gear rack of each of the first rear wheel axle and the second rear wheel axle. A rotation of the pinion by the prime mover causes the first rear wheel axle and the second rear wheel axle to move between the retracted position and the extended position.

In a further embodiment, the front portion of the chassis is pivotably connected to the rear portion of the chassis of the motorized vehicle. The front portion is configured to tilt relative to the rear portion about a tilt axis disposed along a length of the chassis. The motorized vehicle may further include a locking mechanism disposed on one of the front portion and the rear portion of the chassis. The locking mechanism is configured to selectively lock the front portion to the rear portion to militate against the tilt of the front portion relative to the rear portion about the tilt axis unless desired by the driver of the motorized vehicle.

The objectives of this present disclosure are manyfold. It should also be appreciated that the objectives of present disclosure are not limited to just the technology of the motorized vehicle, but also integrate the vehicle design with business features that will make both the motorized vehicle and the business more commercially viable.

A first objective is to integrate the design of the motorized vehicle with business features, making both the motorized vehicle and the business more viable.

A second objective is to provide vehicle manufacturers and end customers a way to incrementally grow a vehicle platform, after its initial sale;

A third objective is to retain the width and the length of a motorcycle with the stability of a four-wheeled automobile.

A fourth objective is to retain at least the following attributes of a motorcycle: fun to drive; narrow enough to lane split; small and easy to park; low cost to purchase; high fuel efficiency; low insurance cost; and having highway capable speeds.

A fifth objective is to retain at least the following attributes of a four-wheeled automobile: protection from the weather; protection from injury during accidents; stability; cargo capacity; body styling; prestige; and highway capable speeds.

A sixth objective is to offer a better value proposition than a conventional four-wheeled automobile or motorcycle.

Further objectives and areas of applicability will become apparent from the description provided herein. It should be understood that the description and specific examples are intended for purposes of illustration only and are not intended to limit the scope of the present disclosure.

DRAWINGS

The above, as well as other advantages of the present disclosure, will become readily apparent to those skilled in the art from the following detailed description, particularly when considered in the light of the drawings described hereafter.

Figure 1:
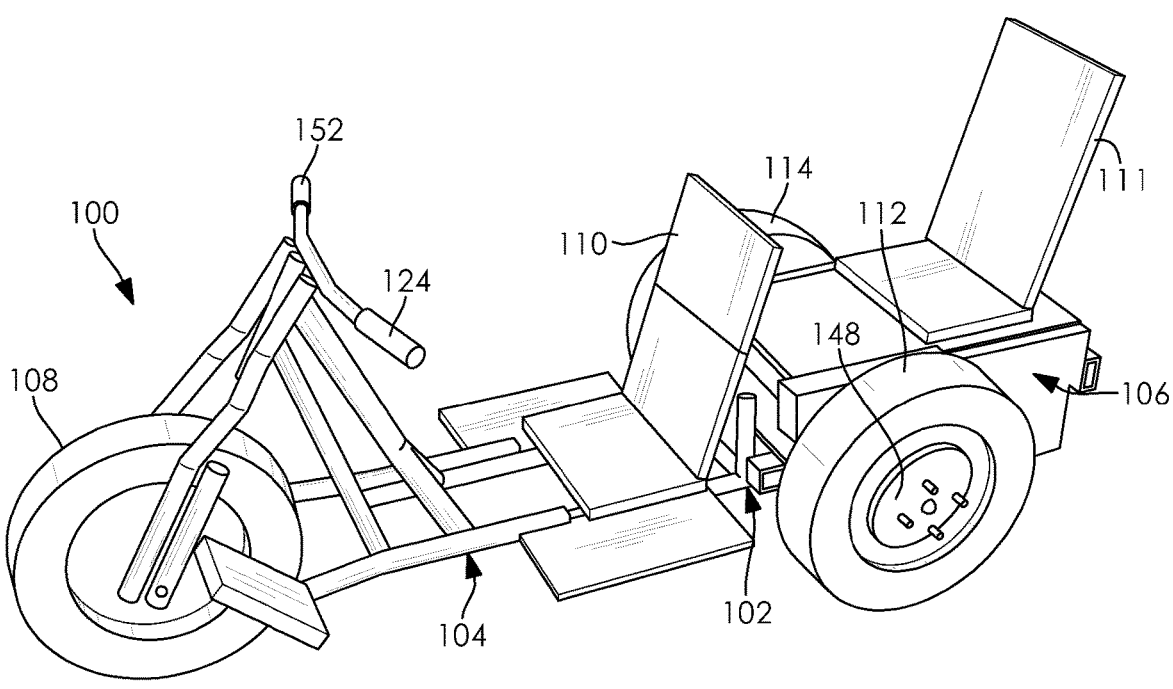
FIG. 1 is a top perspective view of a motorized vehicle according to one embodiment of the present disclosure, and showing the motorized vehicle having a front portion and a rear portion, and with no optional bodywork structure shown to illustrate an underlying chassis of the motorized vehicle.
Figure 8:
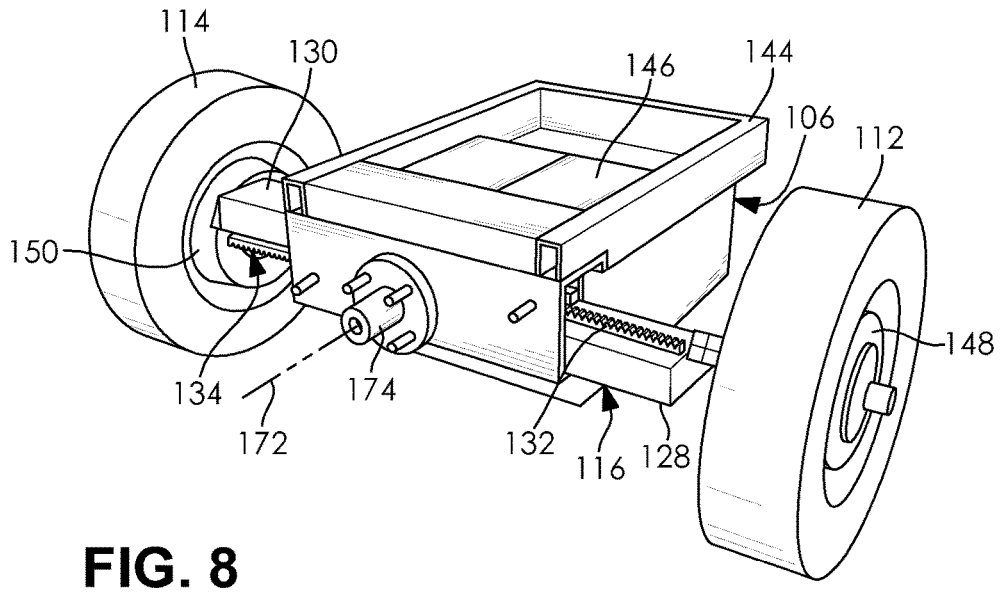
FIG. 8 is a top perspective view of the rear portion of the motorized vehicle of FIG. 1, and further illustrating a gear rack for powered motion of an axle assembly of the rear portion, and also depicting a trailer hub assembly with tapered roller bearings that has been used to link a front and a rear of the motorized vehicle together on an axis.
Figure 25:
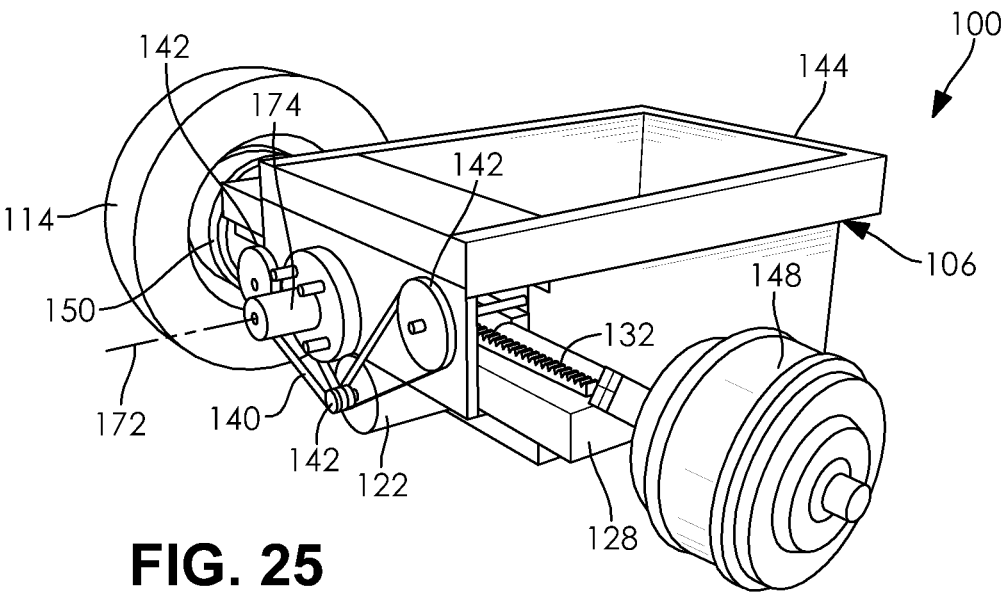
Figure 26:
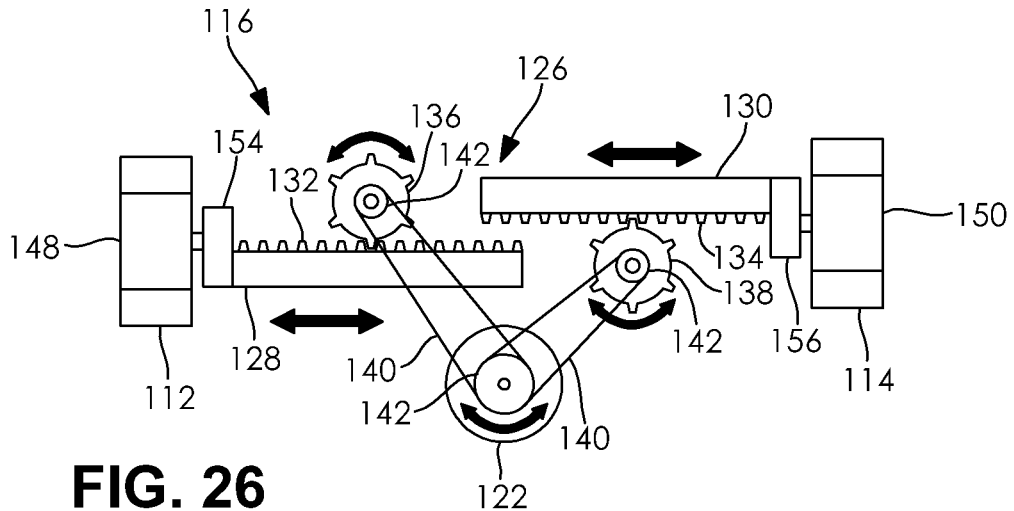

FIG. 25 is a top perspective view of the motorized vehicle of FIGS. 1 and 8, and further illustrating a rack-and-pinion-style linear actuator for the powered motion of an axle assembly of the rear portion, and also depicting the motor for driving the powered motion of the axle assembly, and an electronic hub motor without associated tire for purpose of illustration; and FIG. 26 is a rear elevational view of the rack-and-pinion-style linear actuator shown in FIG. 25 in the absence of surrounding structure of the rear portion for purpose of illustration, with the arrows indicating movement of the various components of the linear actuator in operation.

DETAILED DESCRIPTION

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical.

As shown in FIGS. 1-26, the present disclosure includes a motorized vehicle 100. In particular, the motorized vehicle 100 achieves the objectives set forth hereinabove by being "modular in the field." The motorized vehicle 100 can be provided as a basic platform that will be customized and upgraded by the customer to fit the finances and needs of the customer over time. Also, the motorized vehicle 100 is not designed for a short life span. The motorized vehicle 100 is designed for a long-life span, by being change-able, upgradable, and serviceable in the field. The motorized vehicle 100 also achieves the many objectives of the disclosure by the unique combination of mechanisms and engineering to form a commercially viable vehicle, as set forth hereinbelow.

Figure 2:
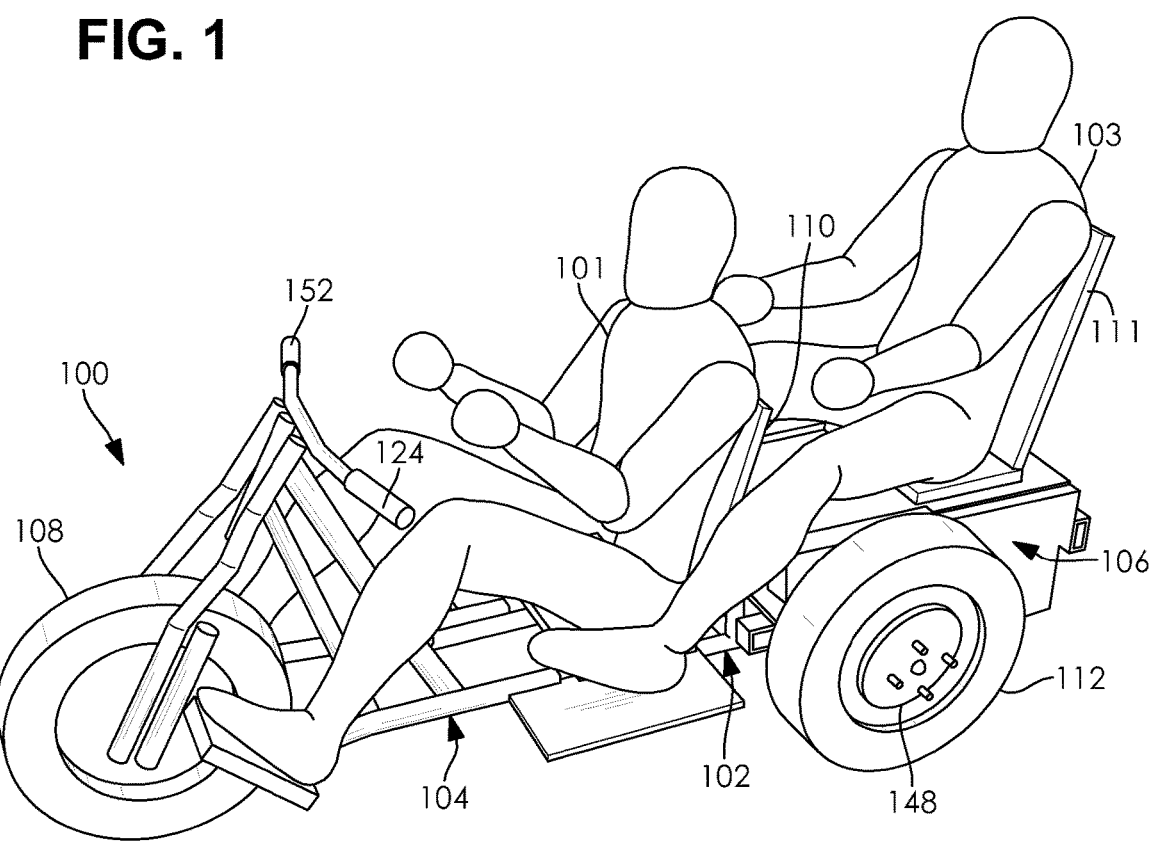
FIG. 2 is a top perspective view the motorized vehicle of FIG. 1 in use with two passengers sitting on the motorized vehicle, and showing a driver sitting on the front portion and a passenger sitting on the rear portion.

With reference to FIGS. 1-9 and 25-26, the motorized vehicle 100 of the present disclosure includes a chassis 102 or "frame" having a front portion 104 and a rear portion 106. The front portion 104 has a front wheel 108 and a driver seat 110. The chassis 102 may also include at least one passenger seat 111 disposed, for example, on the rear portion 106 of the chassis 102 behind the driver seat 110. Taken together, driver seat 110 and the passenger seat 111 of the motorized vehicle 100 may define an operator area of the of the motorized vehicle 100. As shown in FIG. 2, the driver seat 110 is configured to receive a driver 101 for operation of the motorized vehicle 100, and the at least one passenger seat 111 is configured to receive a passenger 103 at a position behind the driver 101.

Figures 9, 10, 11:
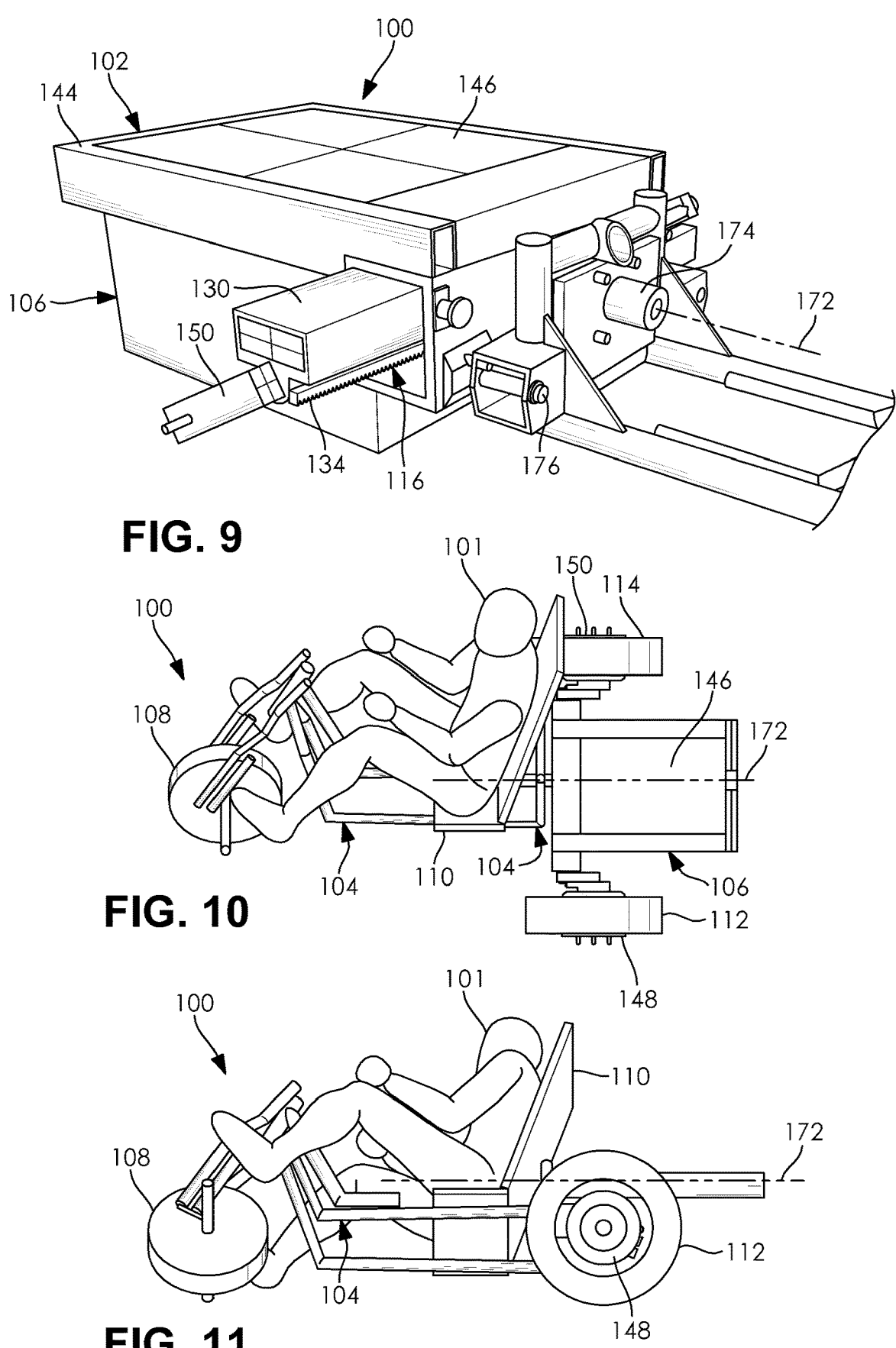
FIG. 9 is another top perspective view of the rear portion of the motorized vehicle of FIGS. 1 and 8, and further illustrating a tilt axis and a spring-loaded shot pin and rubber torsional axles of the rear portion.
FIG. 10 is a top plan view of the front portion of the motorized vehicle of FIG. 1 shown in operation and tilting on the tilt axis, the tilting providing additional stability for the motorized vehicle when bodywork stricture is not an impediment.
FIG. 11 is a side elevational view of the front portion of the motorized vehicle of FIGS. 1 and 10 shown in in operation and tilting on the tilt axis.

The rear portion 106 has a first rear wheel 112, a second rear wheel 114, and a rear axle assembly 116 (shown in FIGS. 8-9 and 25). The first rear wheel 112 and the second rear wheel 114 contact a ground surface and are configured to together power a movement of the motorized vehicle 100 under operation by the driver 101. The rear axle assembly 116 is also configured to be selectively moved between a retracted position (shown, for example, in FIG. 6) and an extended position (shown, for example, in FIG. 7) to maintain stability at various speeds.

Figure 6:
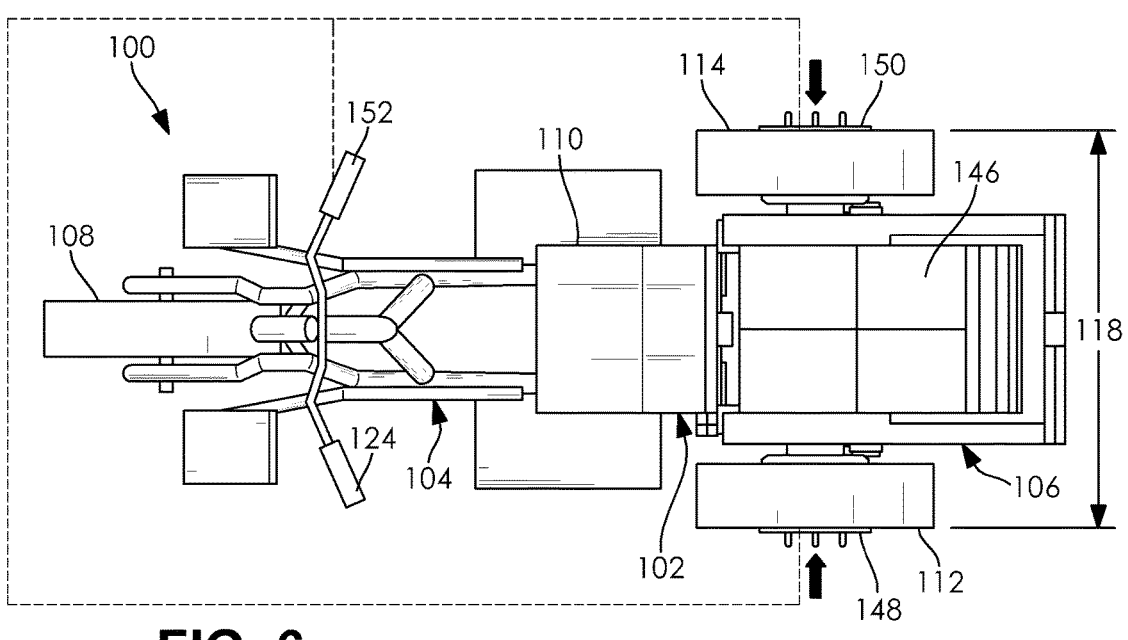
FIG. 6 is a top plan view of the motorized vehicle of FIG. 1, and depicting rear axle assemblies in a retracted state or position with arrows showing movement of the rear axle assemblies in operation.
Figure 7:
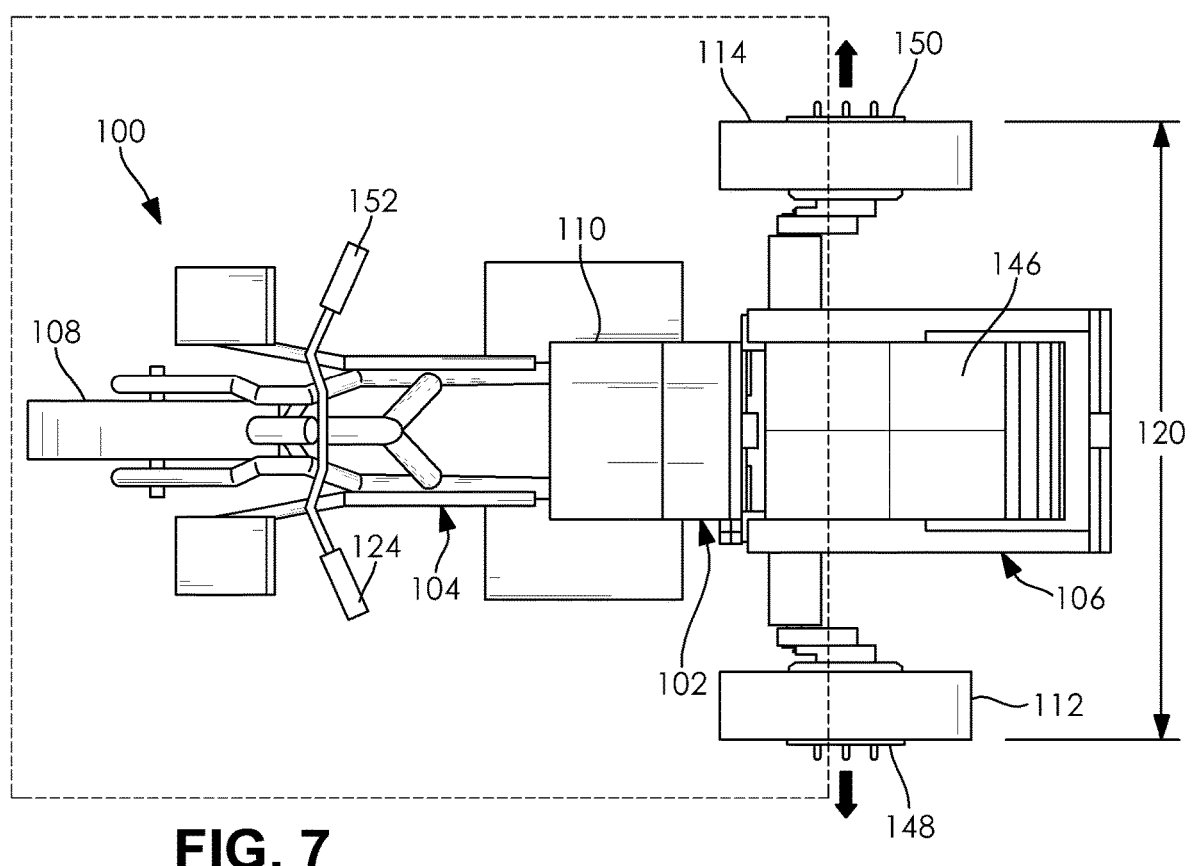
FIG. 7 is a top plan view of the motorized vehicle of FIG. 1, and depicting the rear axle assemblies in an extended state or position with arrows showing movement of the rear axle assemblies in operation.

In particular examples, the rear axle assembly 116 has a minimum width 118 and a maximum width 120, where the minimum width 118 is provided at the retracted position as shown in FIG. 6, and the maximum width 120 is provided at the extended position as shown in FIG. 7. The minimum width 118 may be selected by a skilled artisan to comply with regulatory requirements on maximum widths of vehicles permitted to lane share in traffic. The maximum width 120 may also be selected by the skilled artisan to comply with regularly requirements associated with motor vehicles on roadways, while also optimizing stability of the motorized vehicle 100 in operation. As non-limiting examples, the minimum width 118 of the rear axle assembly 116 in the retracted position may be about eight hundred and eighty millimeters (880 mm), and the maximum width 120 of the rear axle assembly 116 in the extended position may be about twelve hundred and eighty millimeters (1280 mm). Other suitable distances for the minimum width 118 and the maximum width 120 may also be selected within the scope of the present disclosure, as desired.

It should also be appreciated that, in addition to providing the motorized vehicle 100 with the ability to move the first rear wheel 112 and the second rear wheel 114 between retracted and extended positions, the skilled artisan may also select a predetermined or targeted weight distribution for the motorized vehicle 100 to also optimize handling quality in operation. As non-limiting examples, the targeted weight distribution of the front portion 104 may be from about twenty-five percent (25%) to about forty percent (40%) on the front wheel 108, and the targeted weight distribution of the rear portion 106 on the first rear wheel 112 and the second rear wheel 114 may be from about sixty percent (60%) to about seventy-five percent (75%). The weight distributions may be obtained by selective placement and choice of hardware and components on the front portion 104 and the rear portion 106 of the chassis 102. It should be appreciated that other suitable weight distributions may also be selected by one skilled in the art, within the scope of this disclosure.

With reference to FIG. 25, the motorized vehicle 100 of the present disclosure further has a prime mover 122. The prime mover 122 may be disposed on the rear portion 106 of the chassis 102. For example, as shown in FIG. 25, the prime mover 122 may be mounted to an underside of the rear portion 106. The prime mover 122 is configured to selectively move the rear axle assembly 116 between the retracted position and the extended position, as described herein. The prime mover 122 may be one of an electric drive motor, an air cylinder, and a hydraulic cylinder, as non-limiting example. Other suitable types of devices and locations for the prime mover 122 may also be selected, as desired.

In particular, the rear axle assembly 116 may be in communication with a rear axle assembly controller 124 (shown, for example, in FIG. 1). The communication between the rear axle assembly controller 124 may be one of wired and wireless, for example. The rear axle assembly controller 124 is configured to one of manually and automatically move the rear axle assembly 116 between the retracted position and the extended position.

Where the rear axle assembly controller 124 is configured to be manually operated, for example, by the driver 101, and is therefore disposed on the chassis 102 in a location that permits the driver 101 to interact with the rear axle assembly controller 124 while seated in the driver seat 110, for example, as shown in FIG. 2. Although the rear axle assembly controller 124 is shown in FIG. 1 as being disposed on handlebars of the front portion 104 of the chassis 102, one of ordinary skill in the art may select other suitable locations for manual operation of the rear axle assembly controller 124, as desired.

Where the rear axle assembly controller 124 is configured to be automatically operated, for example, as a computer having a processor and memory on which instructions for the automatic operation are embodied in a tangible and non-transitory manner, the location of the rear axle assembly controller 124 may be in a location that does not permit for the interaction with the driver 101. In such examples, the rear axle assembly controller 124 may be disposed within the rear portion 106 of the chassis 102. Other suitable locations for the rear axle assembly controller 124 may also be employed.

With renewed reference to FIGS. 6-9 and 25-26, the rear axle assembly 116 may include at least one linear actuator 126. The linear actuator 126 is in communication with a first rear wheel axle 128 and a second rear wheel axle 130. The first rear wheel 112 is rotatably coupled with the first rear wheel axle 128, and the second rear wheel 114 is rotatably coupled with the second rear wheel axle 130. Each of the first rear wheel axle 128 and the second rear wheel axle 130 may be one of telescopic and sliding, as non-limiting examples. In certain examples, the first rear wheel axle 128 and the second rear wheel axle 130 are sliding, for example, on tracks or rails, with the first rear wheel axle 128 being spaced apart from the second rear wheel axle 130 so that they may move past each other without interferences as the first rear wheel axle 128 and the second rear wheel axle 130 are moved between the retracted position and the extended position.

In a most particular example, the linear actuator 126 is provided in the form of a rack-and-pinion-type actuator. As shown in FIGS. 25 and 26, each of the first rear wheel axle 128 and the second rear wheel axle 130 has at least one gear rack 132, 134. For example, the at least one gear rack 132, 134 may include a first gear rack 132 and a second gear rack 134, for example. The first gear rack 132 may be attached to, or co-formed with, the first rear wheel axle 128. The second gear rack 134 may be attached to, or co-formed with, the second rear wheel axle 130. The linear actuator 126 may further include at least one pinion 136, 138 in communication with prime mover 122 and the at least one gear rack 132,134 of each of the first rear wheel axle 128 and the second rear wheel axle 130. For example, the at least one pinion 136, 138 may include a first pinion 136 that engages with the first gear rack 132, and a second pinion 138 that engages with the second gear rack 134.

The prime mover 122 may also be in coupled to the at least one pinion 136, 138 with linkages 140 that permit for movement to be imparted to the at least one pinion 136, 138. For example, as shown in FIGS. 25 and 26, the linkages may be provided in the form of belts, chains, or gears disposed between the prime mover 122 and pulleys 142 coupled to the prime mover 122 and the at least one pinion 136, 138. Where both the first pinion 136 and the second pinion 138 are coupled with the prime mover 122 in this manner, and the first gear rack 132 and the second gear rack 134 are opposite and face each other within the rear portion 106, it should be appreciated that a rotation of the at least one pinion 136, 138 by the prime mover 122 thereby causes the first rear wheel axle 128 and the second rear wheel axle 130 to slide past each other between the retracted position and the extended position, for example, as shown in FIGS. 6 and 7, respectively. Other suitable means and arrangements for moving the first rear wheel axle 128 and the second rear wheel axle 130 between the retracted and extended positions may also be employed, as desired.

Likewise, one skilled in the art will understand that telescoping or sliding the first rear wheel axle 128 and the second rear wheel axle 130 of the rear axle assembly 116 permits the width of the motorized vehicle 100 to be similar to a standard motorcycle, such as about eighty-eighty centimeters (88 cm). As shown in FIG. 6, where the first rear wheel 112 and the second rear wheel 114 may extended by an outward sliding of the first rear wheel axle 128 and the second rear wheel axle 130 of the rear axle assembly 116, the overall width of the motorized vehicle 100 may be more similar to a smaller four-wheeled automobile, such as one hundred and twenty-eight centimeters (128 cm). Other suitable dimensions may also be selected by a person skilled in the art, within the scope of this disclosure.

With renewed reference to FIGS. 5-9 and 25, the rear portion 106 of the chassis 102 may include a hollow main body 144 having at least one battery module 146 configured to power a movement of at least one of the front wheel 108, the first rear wheel 112, and the second rear wheel 114. In particular, the at least one battery module 146 has a size and a power sufficient to operate the motorized vehicle 100 at speeds suitable for roadways. Suitable batteries can include lithium-ion battery packs with a suitable number of cells disposed in a stack to power the motorized vehicle 100. Other types of battery assemblies and chemistries may be selected by the skilled artisan within the scope of the present disclosure.

In addition, the at least one battery module 146 may be configured to be both easily removable and installed by the end user without specialized tools. Additional battery modules can be disposed on the motorized vehicle 100 or disposed in a trailer (not shown), pulled by the motorized vehicle 100, as desired.

The at least one battery module 146 may also be in electrical communication with a power control and distribution module (not shown) disposed within the hollow main body 144 of the rear portion 106 of the chassis. The power control and distribution module may permit for both the delivery of power to the various components of the motorized vehicle 100 and for a selective recharging of the at least one battery module 146, for example, from a local power grid or source.

Although not shown, it should be appreciated that the motorized vehicle 100 may also include an onboard generator configured for recharging the at least one battery module 146, in certain examples. Further embodiments of the motorized vehicle 100 may include optional drive methods or battery recharge methods accomplished via gasoline or a hybrid gas generator that may be disposed in a trailer (not shown) pulled by the motorized vehicle 100. Other means for employing a generator to recharge the at least one battery module 146 may also be employed by one skilled in art, as desired.

As shown in FIGS. 1-8 and 10-26, the motorized vehicle 100 further has an at least one electric drive motor 148, 150, also referred to as an "electric hub motor," and an electric drive motor controller 152. Each of the at least one electric drive motor 148, 150 and the electric drive motor controller 152 is in electrical communication with the at least one battery module 146. The at least one electric drive motor 148, 150 is attached to one of the front wheel 108, the first rear wheel 112, and the second rear wheel 114. The at least one electric drive motor 148, 150 can maintain highway speeds.

In a particular embodiment, the at least one electric drive motor 148, 150 includes a first rear electric drive motor 148 and a second rear electric drive motor 150. The first rear electric drive motor 148 is connected to the first rear wheel 112 and configured to selectively cause rotation of the first rear wheel 112. The second rear electric drive motor 150 is connected to the second rear wheel 114 and configured to selectively cause rotation of the second rear wheel 114. Although the front wheel 108 is shown in the drawings as being generally free rolling, it should also be appreciated that in other embodiments the motorized vehicle 100 may include a front electric drive motor (not shown) connected to the front wheel 108. One of ordinary skill in the art may select suitable types of electric motors for the electric drive motor controller 152 within the scope of the present disclosure. Additionally, it should be appreciated that other methods of moving the front wheel 108, the first rear wheel 112, and the second rear wheel 114 are contemplated and may be employed by one skilled in the art, within the scope of this disclosure.

The electric drive motor controller 152 is generally disposed on the front portion 104 of the chassis 102, in a location that permits for a convenient manual operation and control of the at least one electric drive motor 148, 150 by the driver 101 of the motorized vehicle 100 while seated in the driver seat 110, for example, as shown in FIG. 2. The electric drive motor controller 152 is in electrical communication, either wired or wirelessly, with the at least one electric drive motor 148, 150 and is configured to permit the driver 101 to control the movement of at least one of the front wheel 108, the first rear wheel 112, and the second rear wheel 114.

As shown in FIGS. 1-2, the electric drive motor controller 152 may be disposed on handlebars of the motorized vehicle 100. Although the electric drive motor controller 152 is shown in FIG. 1 as being disposed on handlebars of the front portion 104 of the chassis 102, one of ordinary skill in the art may select other suitable locations for manual operation of the electric drive motor controller 152, as desired.

Referring now to FIGS. 8-9 and 25-26, in certain embodiments each of the first rear electric drive motor 148 and the second rear electric drive motor 150 the rear axle assembly 116 with rubber torsional axle suspension member 154, 156. In particular, the first rear electric drive motor 148 may be connected to the first rear wheel axle 128 with a first rubber torsional axle suspension member 154, and the second rear electric drive motor 150 may be connected to the second rear wheel axle 130 with a second rubber torsional axle suspension member 156.

It should be appreciated that a rear suspension of the motorized vehicle 100 may achieved by mounting the rubber torsional axle suspension member 154, 156 at the ends the rear axle assembly 116 as described. The first and second rubber torsional axle suspension members 154, 156 (as are commonly used on utility trailers) are fastened into the end of the sliding first and second rear wheel axles 128, 130. Each of the first and second rubber torsional axle suspension members 154, 156 may also have an elongate torque arm, which is configured to receive an axle bolt of a predetermined diameter for the first and second rear electric drive motors 148, 150 and the associated first and second rear wheels 112, 114. A skilled artisan may select a suitable type or formulation of the rubber to be used in the first and second rubber torsional axle suspension members 154, 156, as desired. Advantageously, the first and second rubber torsional axle suspension members 154, 156 provide both spring loading and dampening for suspension of the first and second rear wheels 112, 114.

Figure 3:
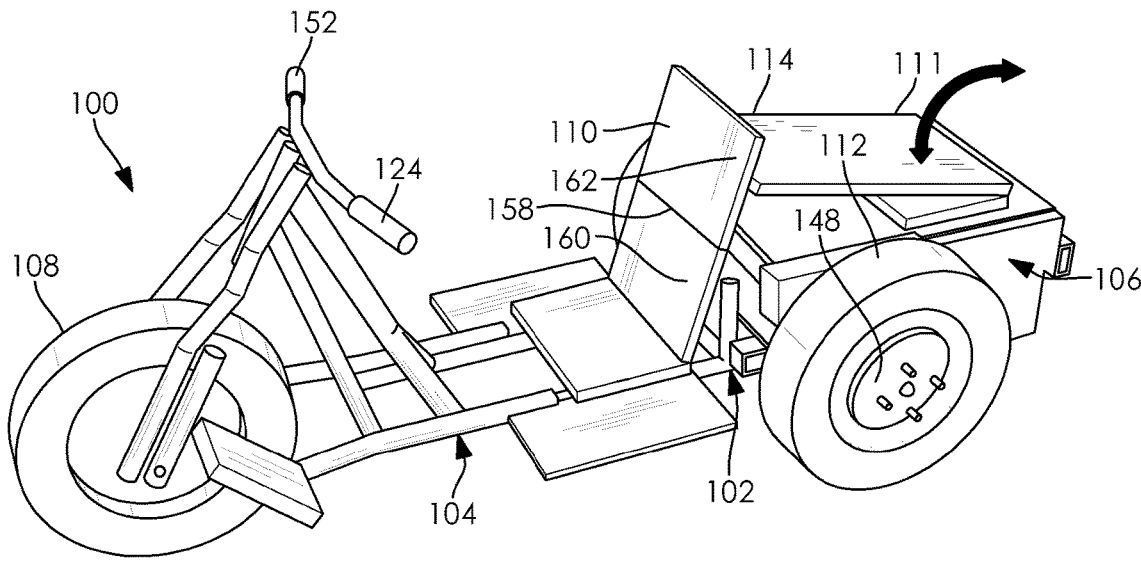
FIG. 3 is a top perspective view of the motorized vehicle of FIG. 1, and showing a collapsible rear passenger seat folding down to a folded position to create space for attaching cargo to the motorized vehicle, with the arrow indicating a direction of movement of the collapsible rear passenger seat.
Figure 4:
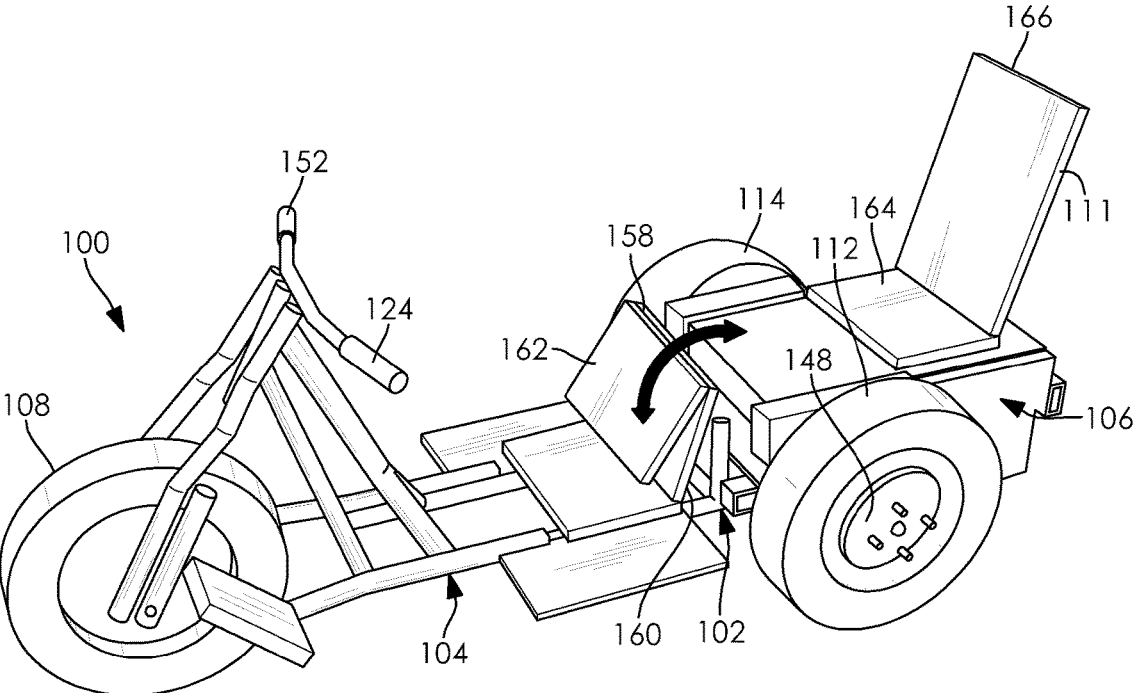
FIG. 4 is a top perspective view of the motorized vehicle of FIG. 1, and showing a collapsible front driver seat folding down to create space so the collapsible rear seat can be easily accessed, with the arrow indicating a direction of movement of the collapsible front driver seat.
Figure 5:
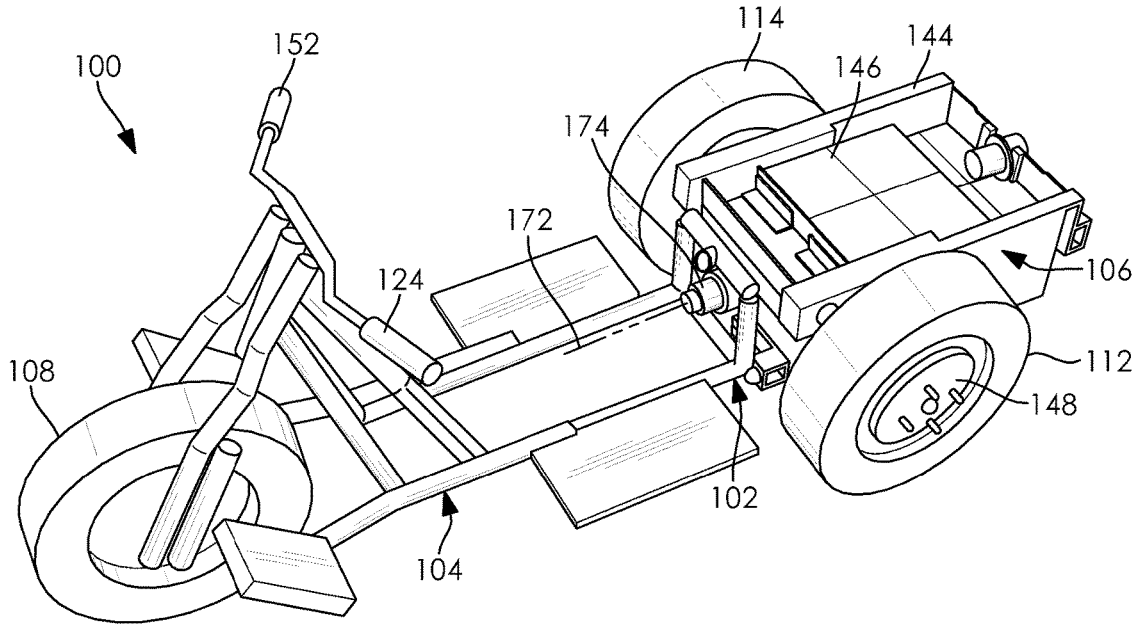
FIG. 5 is a top perspective view the motorized vehicle of FIG. 1, and further illustrating a rear compartment containing and protecting batteries and electronics from external elements such as the weather and tampering.

With renewed reference to FIGS. 3 and 4, in certain embodiments the driver seat 110 of the motorized vehicle 100 is collapsible. For example, the driver seat 110 may have at least one hinge 158 that hingedly connects and separates a first portion 160 from a second portion 162 of the driver seat 110. In operation, the second portion 162 can be folded downwardly from a seated position (shown in FIG. 3) to a folded position (shown in FIG. 4) that permits a passenger to enter and exit the passenger seat 111 of the motorized vehicle 100 more easily.

In further embodiment, as also shown in FIGS. 3 and 4, the passenger seat 111 positioned behind the driver seat 110 may also be collapsible. For example, the passenger seat 111 may have a seat portion 164 and a back portion 166. The back portion 166 may be hingedly attached to the seat portion 164. In operation, the back portion 166 may be folded downwardly on top of the seat portion 164 as shown in FIG. 3. It should be appreciated that the passenger seat 111 may be folded down to create space for cargo, for example. Other means for selectively collapsing the driver seat 110 and the passenger seat 111 are also contemplated and considered to be within the scope of the present disclosure.

In yet other embodiments, at least one of the driver seat 110 and the passenger seat 111 may further have a lifting mechanism (not shown). The lifting mechanism will permit, either alone or in combination with the hinged collapsing described hereinabove, the at least one of the driver seat 110 and the passenger seat 111 to be lifted upwardly to allow occupants to enter and exit the motorized vehicle 100 more easily. Suitable apparatus for the lifting mechanism may be selected by the skilled artisan, as desired.

Figure 14:
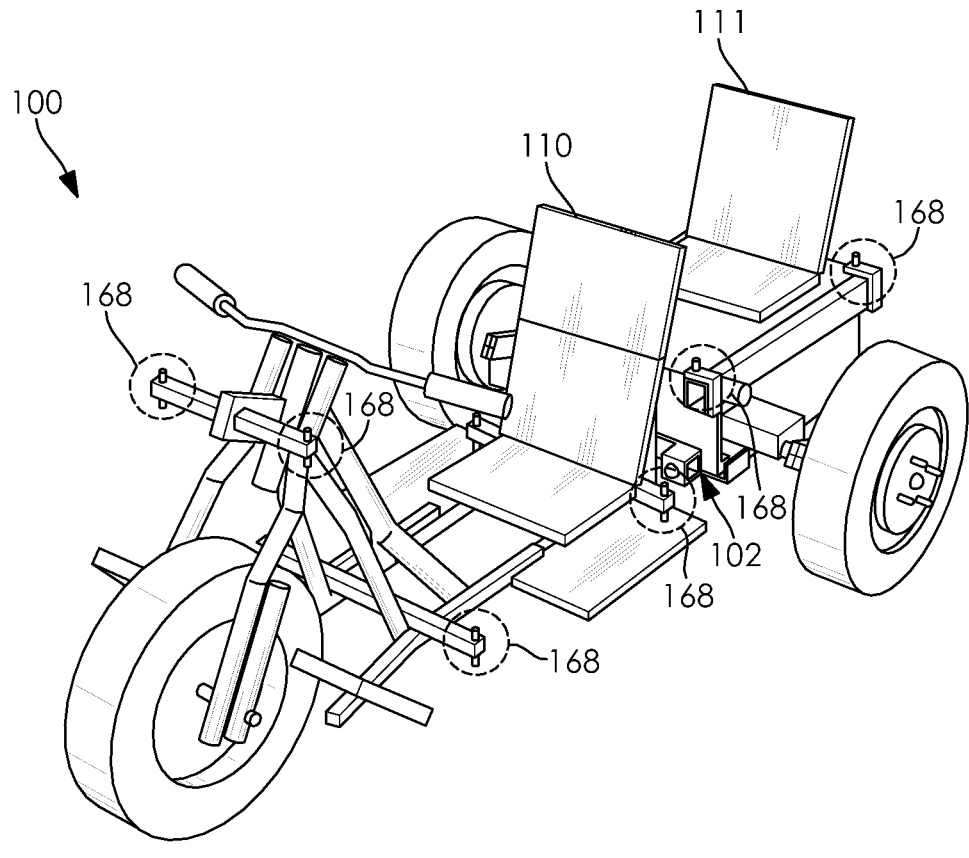
FIG. 14 is a top perspective view of the motorized vehicle of FIG. 1, and further showing a plurality of connection points for mounting optional accessories including roll cage structures and bodywork structure.
Figure 15:
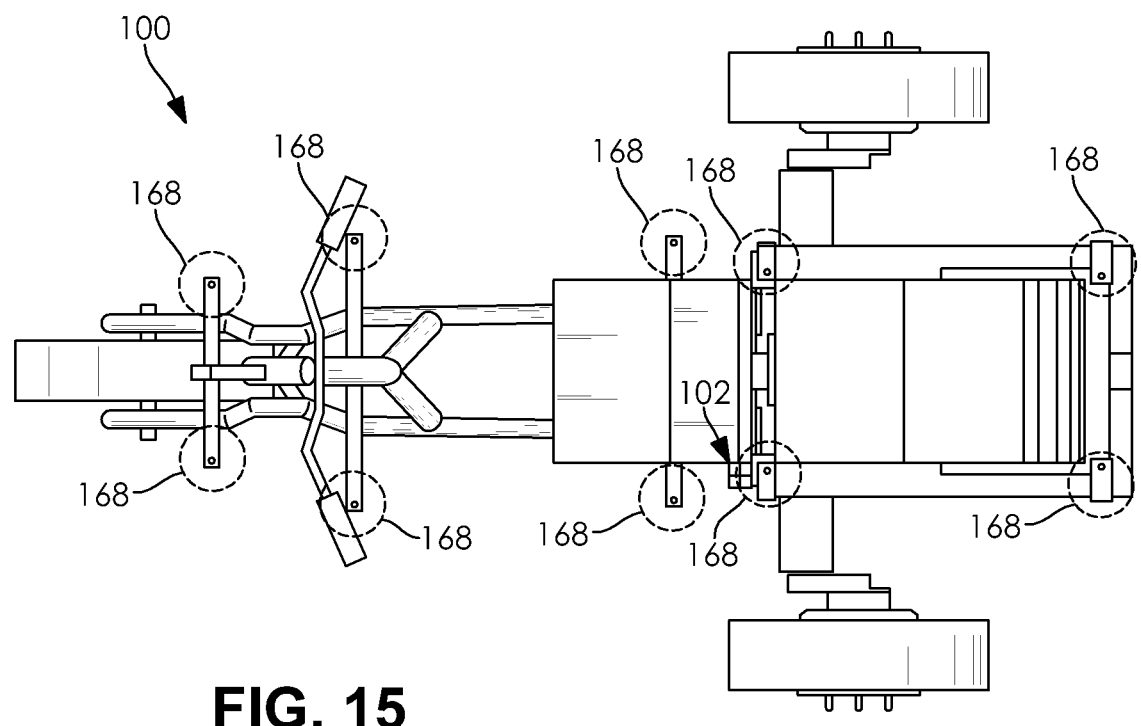
FIG. 15 is a top perspective view of the motorized vehicle of FIGS. 1 and 14, and further showing the plurality of the connection points labeled including six connection points on the front portion and four connection points on the rear portion.
Figures 16, 17:
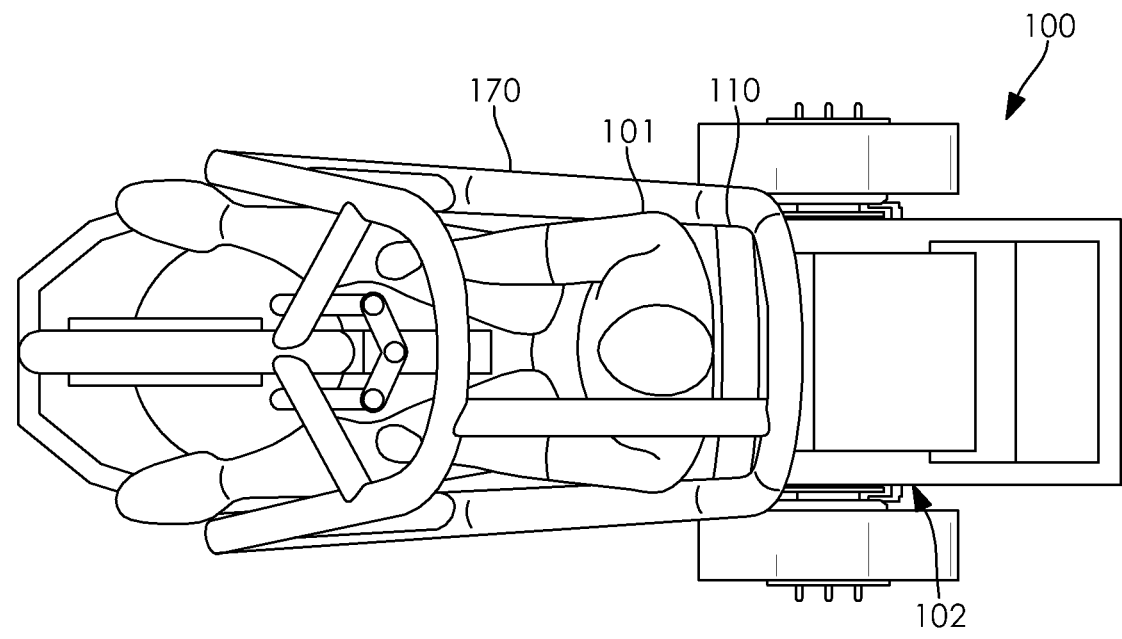
FIG. 16 is a top plan view of the motorized vehicle of FIGS. 1 and 14-15, and showing a roll cage structure attached to the front portion of the motorized vehicle at the connection points, the roll cage structure configured to improve vehicle occupant safety in a minor traffic accident.
FIG. 17 is a top perspective view of the motorized vehicle of FIGS. 1 and 14-16.
Figure 18:
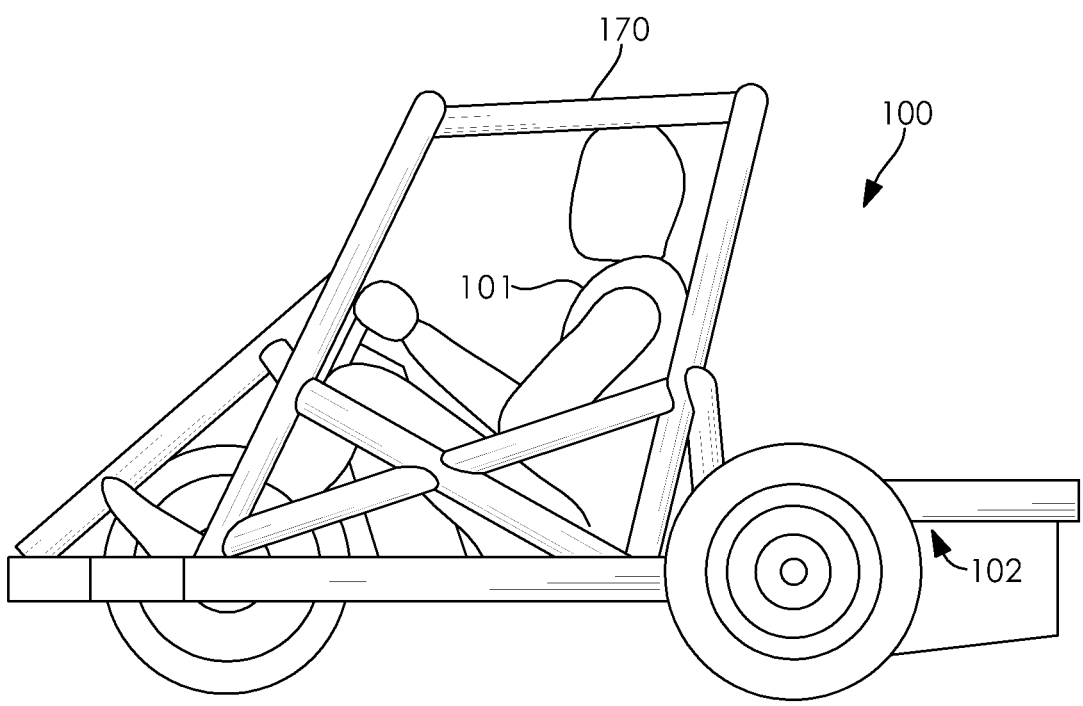
FIG. 18 is a side elevational view of the motorized vehicle of FIGS. 1 and 14-17.
Figure 19:
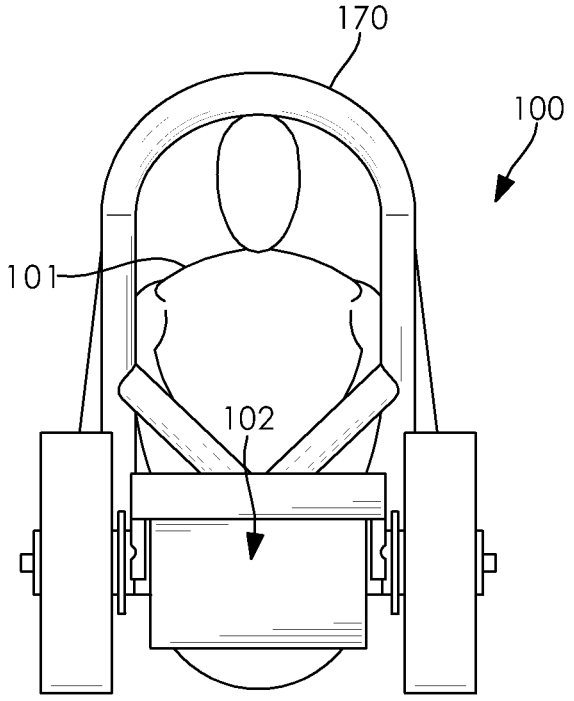
FIG. 19 is a rear elevational view of the motorized vehicle of FIGS. 1 and 14-18.
Figure 20:
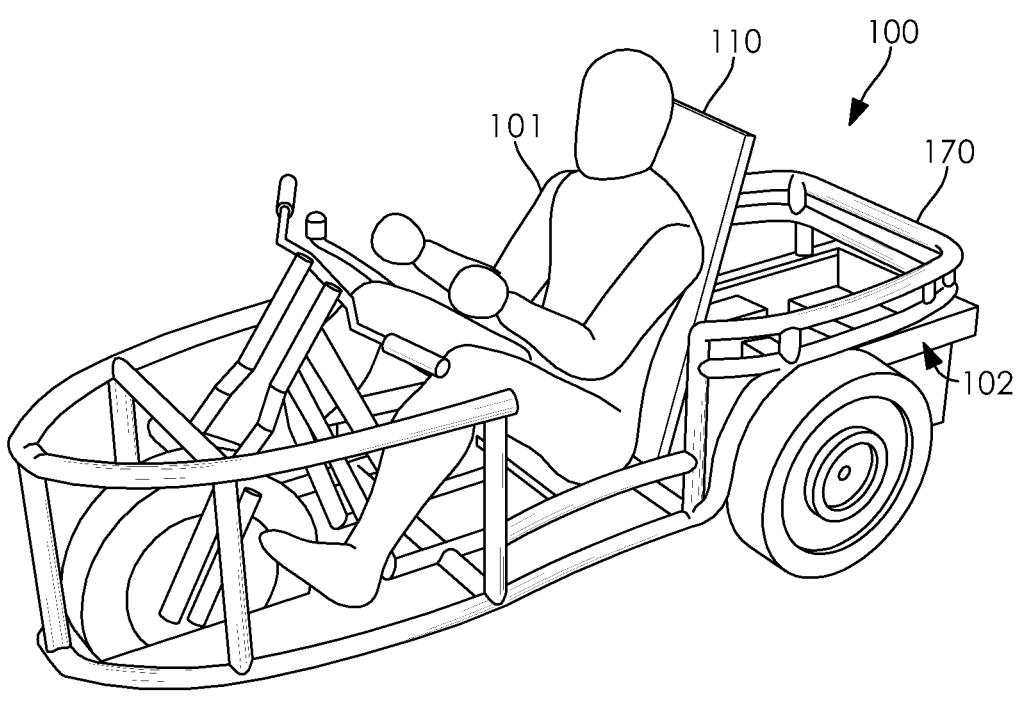
FIG. 20 is a top perspective view of the motorized vehicle of FIGS. 1 and 14, and showing yet another cage structure attached to both the front portion and the rear portion of the motorized vehicle at the connection points, the cage structure configured to improve vehicle occupant safety in a minor traffic accident.

Referring now to FIGS. 14 and 15, the motorized vehicle 100 may also have a plurality of connection points 168. In one non-limiting example, predetermined locations of each of the plurality of connection points 168 is shown below in TABLE 1. One or ordinary skill in the art may select other suitable locations for the connection points 168, as desired.

TABLE 1

| Cartesian (X, Y, Z) Coordinates of Plurality of Connection Points shown in FIGS. 14 and 15. | | | |
|---|---|---|---|
| Platform Connection Point Number Vehicle Center Point Distances from Rear Wheel | | Point Location (Cartesian) | |
| Centerline | X | Y | Z |
| 1 | −554.56 | 0.00 | −246.71 |
| 2 | −712.58 | −174.40 | 762.36 |
| 3 | −712.58 | 174.40 | 762.36 |
| 4 | −432.58 | −274.40 | 223.36 |
| 5 | 191.54 | −306.00 | 223.36 |
| 6 | 191.54 | 253.53 | 223.36 |
| 7 | 374.46 | −192.10 | 441.14 |
| 8 | 374.46 | 192.10 | 441.14 |
| 9 | 1030.11 | −192.10 | 441.14 |
| 10 | 1030.11 | 192.10 | 441.14 |

Advantageously, the connection points 168 permit the chassis 102 to be modularly upgraded with additional components or structures. Desirably, these additional components structures can be added or removed by the user, according to the needs of the user. In particular, the connection points 168 may be defined by mechanical fasteners disposed at the predetermined locations on the chassis 102 of the motorized vehicle 100. In particular, the connection points 168 are configured for attachment of bodywork structure 170 (shown in FIGS. 16-24, for example) to the chassis 102. The mechanical fasteners may include quick connect fasteners, for example, or may include threaded fasteners like screws, bolts, and the like used with fastening nuts or threaded holes to hold the bodywork structure 170 to the chassis 102 of the motorized vehicle 100. One of ordinary skill in the art may select suitable types of connection points 168 within the scope of the present disclosure.

As shown in FIGS. 16-24, the motorized vehicle 100 may include a multitude of different modular components and body styles that can be added or removed to the motorized vehicle 100 by the operator, thereby making the motorized vehicle 100 truly "modular" in nature. The modular components may be formed from suitable materials including wood, metal, polymeric, and composite material, as non-limiting examples.

In certain embodiments, the additional structures include roll cages (for example, as shown in FIGS. 16-20), a cargo box (not shown), additional passenger seating, additional battery modules, windshield assemblies, and other modular components. Desirably, making the bodywork structure 170 such as roll cages optional allows the motorized vehicle 100 to have a low initial cost to a customer. It should also be appreciated that, while roll cages are not required for the motorized vehicle 100, they may provide additional protection from injuries during accidents.

Figure 21:
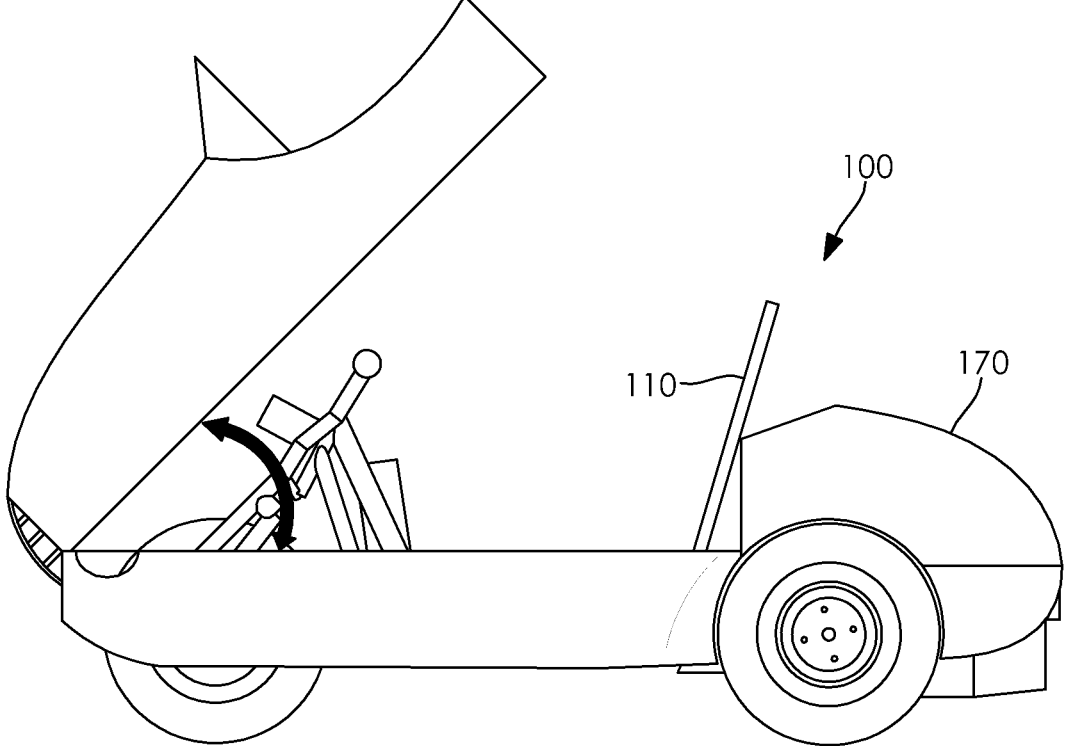
FIG. 21 is a side elevational view of the motorized vehicle of FIGS. 1 and 14, and showing an optional hinged bodywork structure attached to both the front portion and the rear portion of the motorized vehicle at the connection points, the hinged bodywork structure configured to allow for easier occupant entry and exit, with the arrows indicating movement of the hinged bodywork structure.
Figures 22, 23, 24:
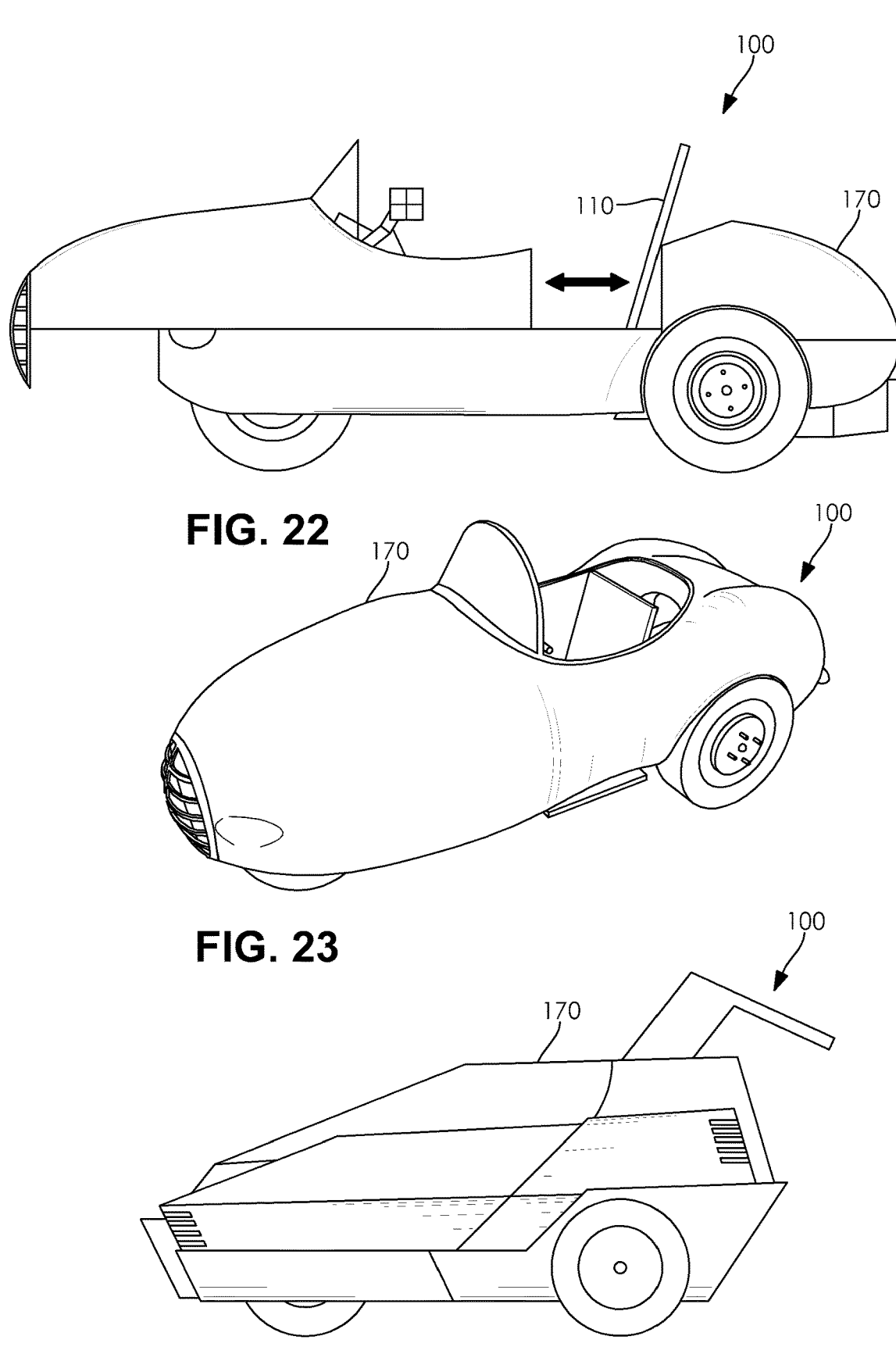
FIG. 22 is a side elevational view of the motorized vehicle of FIGS. 1 and 14, and showing an optional slidable bodywork structure attached to both the front portion and the rear portion of the motorized vehicle at the connection points, the slidable bodywork structure configured to allow for easier occupant entry and exit, with the arrows indicating movement of the slidable bodywork structure.
FIG. 23 is a top perspective view of the motorized vehicle of FIGS. 1 and 14, and showing an optional bodywork structure with vintage styling.
FIG. 24 is a side elevational view of the motorized vehicle of FIGS. 1 and 14, and showing an optional bodywork structure with modern styling.

The additional structures may also include body styles. The body styles may include, as non-limiting examples: i) a bodywork structure 170 having a hinged nose that lifts to allow occupants to enter and exit the motorized vehicle 100, as shown in FIG. 21; ii) a bodywork structure 170 having a sliding nose that slides to allow occupants to enter and exit the motorized vehicle 100, as shown in FIG. 22; iii) a simple bodywork structure 170 with no moving parts, as shown in FIG. 23; iv) a bodywork structure 170 having advertising placards (not shown); v) a bodywork structure 170 having flexible fabric stretched over the chassis 102 (not shown); vi) a minimalist bodywork structure 170 protecting only portions of the motorized vehicle from wind and rain and other elements (not shown); and vii) a fully enclosed and fully featured bodywork structure 170, as shown in FIG. 24. Other suitable body styles may be employed by a skilled artisan, as desired.

In a most particular embodiment, the bodywork structure 170 for attachment to the chassis 102 of the motorized vehicle 100 may have a predetermined dimension selected to provide a total length of the motorized vehicle 100 (including the chassis 102 and the bodywork structure 170) that is less than about twenty-four hundred millimeters (2400 mm).

Figures 12, 13:
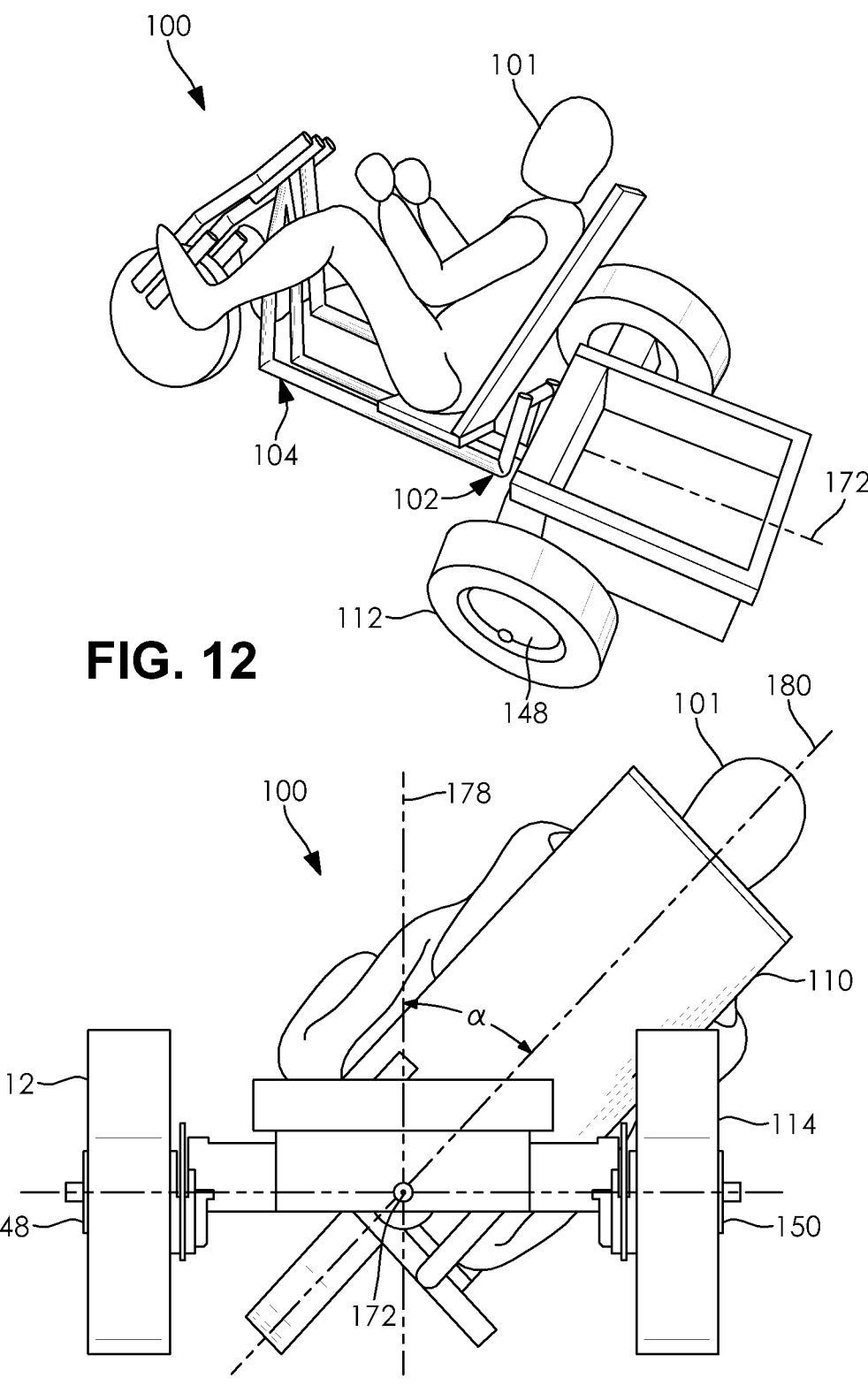
FIG. 12 is a top perspective view of the front portion of the motorized vehicle of FIGS. 1 and 10-11 shown in operation and tilting on the tilt axis.
FIG. 13 is a rear elevational view of the front portion of the motorized vehicle of FIGS. 1 and 10-12 shown in operation and tilting on the tilt axis, the tilting having a tilt angle defined by an angle between a vertical plane and a tilted plane of the front portion.

Referring now to FIGS. 8-13 and 25, the motorized vehicle 100 may be configured such that the front portion 104 is manually pivotable by the driver 101 relative to the rear portion 106 of the chassis 102. In particular, the front portion 104 may be pivotably connected to the rear portion 106 of the chassis 102 so that the front portion 104 is configured to tilt relative to the rear portion 106 about a tilt axis 172 disposed centrally along a length of the chassis 102. More particularly, as shown in FIG. 13, the front portion 106 may be normally oriented on a vertical plane 178 that intersects the tilt axis 172. Through a manual invention by the driver 101, the first portion 104 may be caused to tilt to a tilted plane 180 that also intersects the title axis 172. The tilting by the driver 101 can therefore be defined by a tilt angle alpha ($\alpha$) between the vertical plane 178 and the tilted plane 180. The motorized vehicle 100 may be configured so as to limit the tilt angle $\alpha$ to a predetermined maximum angle permitting for stable operation of the motorized vehicle 100 by the driver 101. One skilled in the art may select a suitable degree of the predetermined maximum angle, as desired.

In certain examples, the pivotal connection may be provided via a rod-and-cylinder connector 174, for example, as shown in FIGS. 8-9 and 25. In this example, the cylinder may be disposed on the rear portion 106 and the corresponding rod may be disposed on the front portion 104, with the cylinder receiving the rod and permitting the pivoting movement. However, other suitable means for pivotably connecting the front portion 104 with the rear portion 106 of the chassis 102 may also be employed within the scope of the present disclosure.

In yet another embodiment, the chassis 102 may be further provided with a locking mechanism 176 that is configured to selectively lock the front portion 104 to the rear portion 106 to militate against the tilt of the front portion 104 relative to the rear portion 106 about the tilt axis 172. In one example, shown in FIG. 9, the locking mechanism 176 is a spring-loaded shot pin disposed on one of the front portion 104 and the rear portion 106 of the chassis 102. The shot pin may be released by use of a cable that extends to a left-hand throttle twist grip, for example. In this example, a right-hand twist grip on handlebars may be used to control vehicle throttle and the left-hand twist grip may be used to release the locking mechanism 176 and permit the manual tilting by the driver 101.

In another example, the locking mechanism 176 may be a powered mechanism such as a solenoid operated pin in electrical communication with the at least one battery module 146 that can be actuated by the driver 101 through control means such as a button or lever. A skilled artisan may also select other suitable types of the locking mechanism 176, as desired.

It should be appreciated that the motorized vehicle 100 may have further stability by permitting the front portion of the motorized vehicle to tilt on the tilt axis 172. The motorized vehicle 100 is prevented from tilting from a stationary, upright position by being locked upright by use of the locking mechanism 176 as described hereinabove. It is believed that tilting is fun for the driver 101 of the motorized vehicle 100 as it simulates the tilting of a motor-cycle.

Accordingly, the motorized vehicle offers advantages for both producers of base vehicle, producers of accessories, and customers of vehicles. As mentioned previously, optional bodywork structure can be added to partially or fully enclose the motorized vehicle to allow it to be a practical vehicle for its intended use. Owners can change their motorized vehicles to suit their needs at minimal cost. The motorized vehicle can serve many different uses.

The motorized vehicle achieves stability due to its unique combination of construction, center of gravity, and stabilizing mechanisms. Stability is sufficient to have highway speed cornering stability even with optional bodywork structure. The motorized vehicle, even with bodywork, is narrow enough to split lanes in traffic jams, adding significantly to its value proposition.

While certain representative embodiments and details have been shown for purposes of illustrating the invention, it will be apparent to those skilled in the art that various changes may be made without departing from the scope of the disclosure, which is further described in the following appended claims.

What is claimed is:

1. A motorized vehicle, comprising:

a chassis having a front portion and a rear portion, the front portion having a front wheel and a driver seat, and the rear portion having a first rear wheel, a second rear wheel, and a rear axle assembly configured to be selectively moved between a retracted position and an extended position to maintain stability at various speeds, the front portion configured to tilt relative to the rear portion about a tilt axis disposed along a length of the chassis, the rear portion including a hollow main body having at least one battery module configured to power a movement of at least one of the front wheel, the first rear wheel, and the second rear wheel, and at least one passenger seat disposed on the rear portion of the chassis behind the driver seat; and a prime mover of the chassis configured to move the rear axle assembly configured to be selectively moved between a retracted position and an extended position.

2. The motorized vehicle of claim 1, wherein a maximum width of the rear axle assembly in the retracted position is about 880 mm and a minimum width of the rear axle assembly in the extended position is about 1280 mm.

3. The motorized vehicle of claim 1, further including at least one electric drive motor and an electric drive motor controller, the at least one electric drive motor attached to one of the front wheel, the first rear wheel, and the second rear wheel, and the electric drive motor controller disposed on the front portion of the chassis, the at least one electric drive motor in electrical communication with the at least one battery module, and the electric drive motor controller in electrical communication with the at least one electric drive motor and configured to permit a driver to control the movement of at least one of the front wheel, the first rear wheel, and the second rear wheel.

4. The motorized vehicle of claim 3, where the at least one electric drive motor includes a first rear electric drive motor connected to the first rear wheel, and a second rear electric drive motor connected to the second rear wheel.

5. The motorized vehicle of claim 4, wherein each of the first rear electric drive motor and the second rear electric drive motor is connected to the rear axle assembly with rubber torsional axle suspension member.

6. The motorized vehicle of claim 1, wherein the driver seat is collapsible.

7. The motorized vehicle of claim 1, wherein the at least one passenger seat is collapsible.

8. The motorized vehicle of claim 1, further comprising a plurality of connection points configured for attachment of bodywork structure to the chassis.

9. The motorized vehicle of claim 8, further comprising the bodywork structure attached to the chassis with at least a portion of the plurality of connection points.

10. The motorized vehicle of claim 9, wherein the bodywork structure includes a roll cage.

11. The motorized vehicle of claim 9, wherein a total length of the motorized vehicle including the chassis and the bodywork structure is less than about 2400 mm.

12. The motorized vehicle of claim 1, further comprising a locking mechanism configured to selectively lock the front portion to the rear portion to militate against a tilt of the front portion relative to the rear portion about the tilt axis.

13. The motorized vehicle of claim 12, wherein the locking mechanism is a spring-loaded shot pin disposed on one of the front portion and the rear portion of the chassis.

14. A motorized vehicle, comprising:

a chassis having a front portion and a rear portion, the front portion having a front wheel and a driver seat, and the rear portion having a first rear wheel, a second rear wheel, and a rear axle assembly configured to be selectively moved between a retracted position and an extended position to maintain stability at various speeds, the front portion configured to tilt relative to the rear portion about a tilt axis disposed along a length of the chassis, the rear portion having a hollow main body, and at least one passenger seat disposed on the rear portion of the chassis behind the driver seat;

at least one battery module disposed in the hollow main body of the rear portion configured to power a movement of at least one of the front wheel, the first rear wheel, and the second rear wheel;

a first rear electric drive motor connected to the first rear wheel;

a second rear electric drive motor connected to the second rear wheel;

an electric drive motor controller disposed on the front portion of the chassis, the electric drive motor controller in electrical communication with the first rear electric drive motor and the second rear electric drive motor and configured to permit a driver to control the movement the first rear wheel and the second rear wheel;

a prime mover disposed in the rear portion of the chassis and configured to selectively move the rear axle assembly between the retracted position and the extended position; and a rear axle assembly controller in communication with the rear axle assembly, the rear axle assembly controller configured to one of manually and automatically move the rear axle assembly between the retracted position and the extended position.

* * * * *